United States Patent
Byrne et al.

(10) Patent No.: US 11,722,758 B2
(45) Date of Patent: Aug. 8, 2023

(54) VEHICULAR CAMERA WITH THERMAL COMPENSATING MEANS

(71) Applicant: Magna Electronics Inc., Auburn Hills, MI (US)

(72) Inventors: Steven V. Byrne, Goodrich, MI (US); Jonathan D. Conger, Berkley, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/663,223

(22) Filed: May 13, 2022

(65) Prior Publication Data

US 2022/0272243 A1 Aug. 25, 2022

Related U.S. Application Data

(63) Continuation of application No. 17/248,628, filed on Feb. 1, 2021, now Pat. No. 11,343,414, which is a continuation of application No. 16/680,658, filed on Nov. 12, 2019, now Pat. No. 10,911,647.

(60) Provisional application No. 62/758,723, filed on Nov. 12, 2018.

(51) Int. Cl.
| | |
|---|---|
| *B60R 11/04* | (2006.01) |
| *H04N 23/52* | (2023.01) |
| *G02B 7/02* | (2021.01) |
| *H04N 23/54* | (2023.01) |
| *H04N 23/55* | (2023.01) |
| *B60R 1/12* | (2006.01) |
| *B60R 11/02* | (2006.01) |

(Continued)

(52) U.S. Cl.
CPC .............. *H04N 23/52* (2023.01); *B60R 11/04* (2013.01); *G02B 7/02* (2013.01); *H04N 23/54* (2023.01); *H04N 23/55* (2023.01); *B60R 1/00* (2013.01); *B60R 1/12* (2013.01); *B60R 11/0235* (2013.01); *B60R 2001/1215* (2013.01); *B60R 2001/1253* (2013.01); *B60R 2011/004* (2013.01); *B60R 2300/105* (2013.01)

(58) Field of Classification Search
None
See application file for complete search history.

(56) References Cited

U.S. PATENT DOCUMENTS

| | | |
|---|---|---|
| 4,712,879 A | 12/1987 | Lynam et al. |
| 5,393,931 A | 2/1995 | Guenther |
| 5,412,510 A | 5/1995 | Iizuka et al. |

(Continued)

*Primary Examiner* — Christopher G Findley
(74) *Attorney, Agent, or Firm* — Honigman LLP

(57) ABSTRACT

A vehicular camera includes a camera housing having a first portion and a second portion joined to the first portion. The first portion of the camera housing accommodates a lens and has an attaching portion having a first coefficient of thermal expansion (CTE). A circuit board includes circuitry disposed at a circuit board substrate that has a second CTE that is different from the first CTE. The circuitry includes an imager. The circuit board substrate is attached at the attaching portion of the first portion of the camera housing. When the vehicular camera is operated at an operating temperature greater than 50 degrees C., the attaching portion expands a greater degree than the circuit board substrate. When the vehicular camera is operated at an operating temperature below −20 degrees C., the attaching portion contracts a greater degree than the circuit board substrate.

27 Claims, 6 Drawing Sheets

(51) Int. Cl.
    *B60R 1/00*        (2022.01)
    *B60R 11/00*       (2006.01)

(56)              References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 5,978,017 A | 11/1999 | Tino |
| 6,151,065 A | 11/2000 | Steed et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,479,986 B2 | 1/2009 | Karaki |
| 7,480,149 B2 | 1/2009 | DeWard et al. |
| 7,595,943 B2 | 9/2009 | Yuan |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,256,821 B2 | 9/2012 | Lawlor et al. |
| 8,542,451 B2 | 9/2013 | Lu et al. |
| 8,994,878 B2 | 3/2015 | Byrne et al. |
| 9,077,098 B2 | 7/2015 | Latunski |
| 9,233,641 B2 | 1/2016 | Sesti et al. |
| 9,277,104 B2 | 3/2016 | Sesti et al. |
| 9,596,387 B2 | 3/2017 | Achenbach et al. |
| 9,621,769 B2 | 4/2017 | Mai et al. |
| 10,207,646 B2 | 2/2019 | Oh |
| 10,274,812 B1 | 4/2019 | Chen |
| 10,645,795 B2 | 5/2020 | Byrne et al. |
| 10,676,041 B2 | 6/2020 | Sesti et al. |
| 10,750,064 B2 | 8/2020 | Byrne et al. |
| 10,911,647 B2 | 2/2021 | Byrne et al. |
| 11,343,414 B2 | 5/2022 | Byrne et al. |
| 2003/0090569 A1 | 5/2003 | Poechmueller |
| 2004/0169771 A1 | 9/2004 | Washington et al. |
| 2007/0146908 A1 | 6/2007 | Li |
| 2009/0244361 A1 | 10/2009 | Gebauer et al. |
| 2009/0295181 A1 | 12/2009 | Lawlor et al. |
| 2011/0025850 A1 | 2/2011 | Maekawa et al. |
| 2011/0063740 A1 | 3/2011 | Sudoh |
| 2011/0298925 A1 | 12/2011 | Inoue et al. |
| 2012/0019905 A1 | 1/2012 | Teraoka et al. |
| 2012/0019940 A1 | 1/2012 | Lu et al. |
| 2013/0183499 A1 | 7/2013 | Kido et al. |
| 2013/0242099 A1 | 9/2013 | Sauer et al. |
| 2014/0104184 A1 | 4/2014 | Meador et al. |
| 2014/0160284 A1 | 6/2014 | Achenbach et al. |
| 2014/0226012 A1 | 8/2014 | Achenbach |
| 2014/0298642 A1 | 10/2014 | Sesti et al. |
| 2014/0373345 A1 | 12/2014 | Steigerwald |
| 2015/0015713 A1 | 1/2015 | Wang et al. |
| 2015/0029337 A1 | 1/2015 | Uchiyama et al. |
| 2015/0054961 A1 | 2/2015 | Saitoh et al. |
| 2015/0070557 A1 | 3/2015 | Petty et al. |
| 2015/0124098 A1 | 5/2015 | Winden et al. |
| 2015/0177474 A1 | 6/2015 | Tsuzuki et al. |
| 2015/0205186 A1 | 7/2015 | Park et al. |
| 2015/0222795 A1 | 8/2015 | Sauer et al. |
| 2015/0266430 A1 | 9/2015 | Mleczko et al. |
| 2015/0299795 A1 | 10/2015 | Sauer et al. |
| 2015/0327398 A1 | 11/2015 | Achenbach et al. |
| 2015/0365569 A1 | 12/2015 | Mai et al. |
| 2015/0379361 A1 | 12/2015 | Boulanger |
| 2016/0018619 A1* | 1/2016 | Gustafson ............. G02B 7/026 |
| 2016/0037028 A1 | 2/2016 | Biemer |
| 2016/0191863 A1 | 6/2016 | Minikey, Jr. et al. |
| 2016/0243987 A1 | 8/2016 | Kendall |
| 2016/0268716 A1 | 9/2016 | Conger et al. |
| 2016/0286103 A1 | 9/2016 | Van Dan Elzen |
| 2017/0036600 A1 | 2/2017 | Whitehead et al. |
| 2017/0048463 A1 | 2/2017 | Mleczko |
| 2017/0054881 A1 | 2/2017 | Conger et al. |
| 2017/0126938 A1 | 5/2017 | Newiger |
| 2017/0133811 A1 | 5/2017 | Conger et al. |
| 2017/0201661 A1 | 7/2017 | Conger |
| 2017/0280034 A1 | 9/2017 | Hess et al. |
| 2017/0295306 A1 | 10/2017 | Mleczko |
| 2017/0302829 A1 | 10/2017 | Mleczko et al. |
| 2017/0315426 A1* | 11/2017 | Ida ........................ G03B 17/08 |
| 2018/0027151 A1 | 1/2018 | Kazama et al. |
| 2018/0033741 A1 | 2/2018 | Dubey et al. |
| 2018/0042106 A1* | 2/2018 | Scheja .................. H04N 23/54 |
| 2018/0072239 A1 | 3/2018 | Wienecke et al. |
| 2018/0098033 A1 | 4/2018 | Mleczko et al. |
| 2018/0241917 A1 | 8/2018 | Zhang et al. |
| 2018/0376123 A1* | 12/2018 | Rendlen ................ H04N 23/52 |
| 2019/0121051 A1 | 4/2019 | Byrne et al. |
| 2019/0124238 A1 | 4/2019 | Byrne et al. |
| 2019/0124243 A1 | 4/2019 | Mleczko et al. |
| 2019/0166289 A1 | 5/2019 | Knutsson et al. |
| 2019/0306966 A1 | 10/2019 | Byrne et al. |
| 2020/0001787 A1 | 1/2020 | Lu et al. |
| 2020/0010024 A1 | 1/2020 | Sesti et al. |
| 2020/0033549 A1 | 1/2020 | Liu et al. |

* cited by examiner

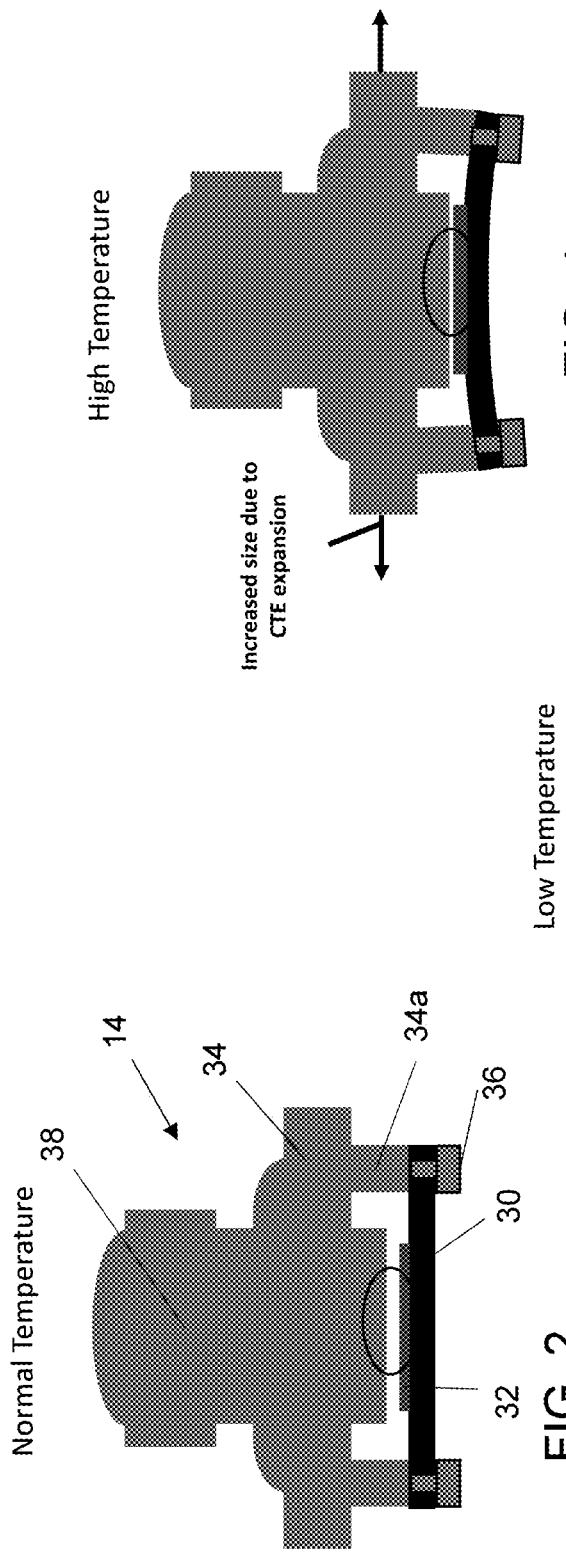

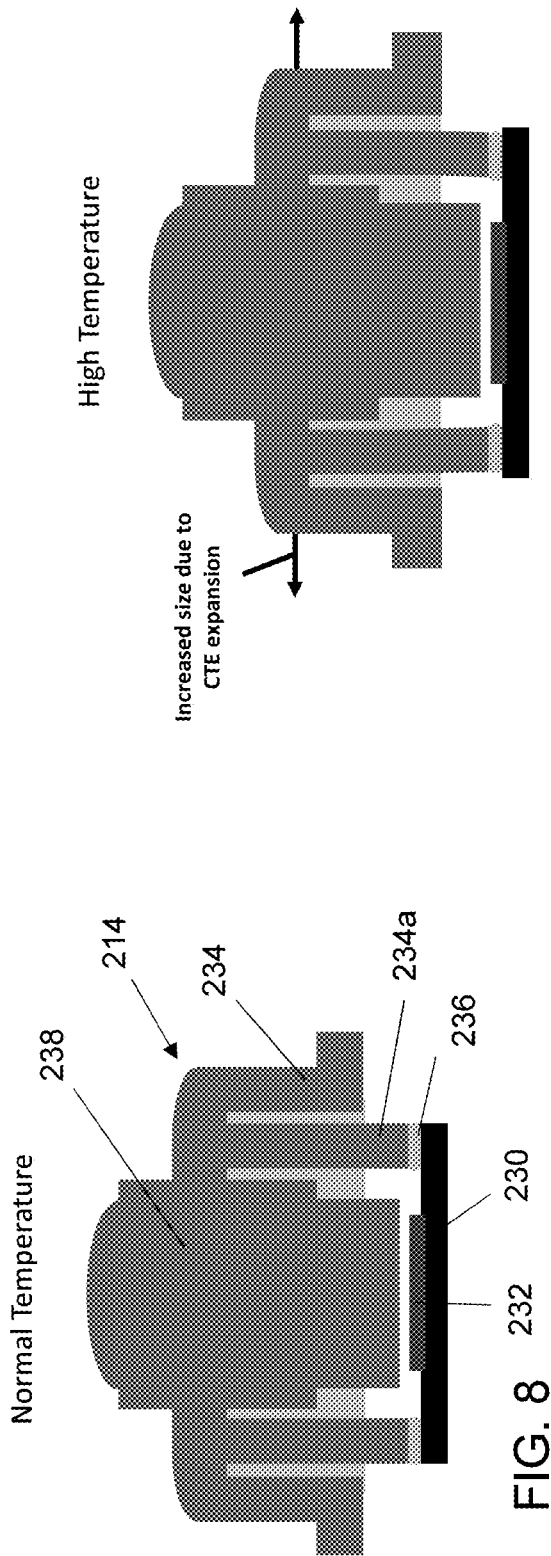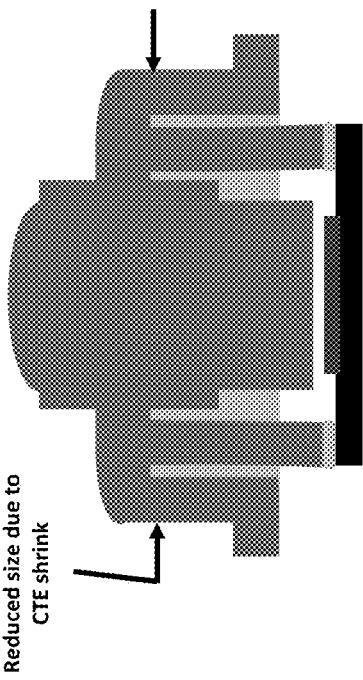
FIG. 8
FIG. 9
FIG. 10

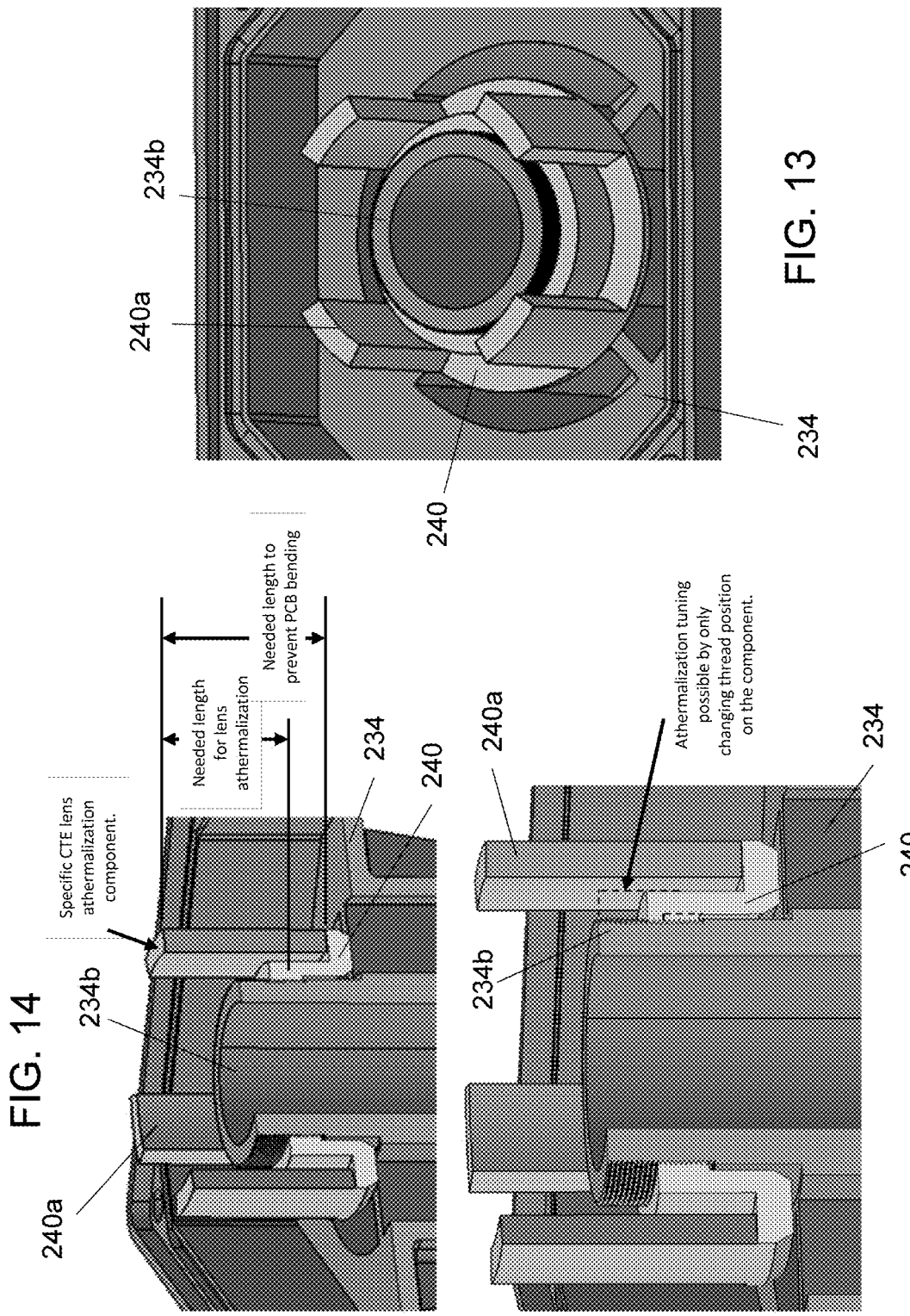

VEHICULAR CAMERA WITH THERMAL COMPENSATING MEANS

CROSS REFERENCE TO RELATED APPLICATIONS

The present application is a continuation of U.S. patent application Ser. No. 17/248,628, filed Feb. 1, 2021, now U.S. Pat. No. 11,343,414, which is a continuation of U.S. patent application Ser. No. 16/680,658, filed Nov. 12, 2019, now U.S. Pat. No. 10,911,647, which claims the filing benefits of U.S. provisional application Ser. No. 62/758,723, filed Nov. 12, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, and provides a means for accommodating different degrees of thermal expansion and contraction of the circuit board relative to the lens holder (due to the circuit board having a coefficient of thermal expansion (CTE) that is different from the CTE of the lens holder or structure at which the circuit board is mounted). When the camera is disposed at the vehicle and exposed to a higher or lower temperature (such as, for example, greater than 40 degrees C. or less than 0 degrees C.), the circuit board and support structure accommodate the different degrees of expansion and contraction such that the circuit board remains planar or non-flexed and such that an imaging plane of the imager disposed at the circuit board remains orthogonal or normal to the optical axis of the lens. For example, the circuit board may be attached at the support structure via fasteners that are received through oversized holes in the circuit board substrate, or the circuit board may be attached at the support structure via a plurality of spaced apart posts that are radially flexible to flex toward or away from an optical axis of the lens or lens assembly.

These and other objects, advantages, purposes and features of the present invention will become apparent upon review of the following specification in conjunction with the drawings.

BRIEF DESCRIPTION OF THE DRAWINGS

FIG. 2 is a sectional view of a camera with a circuit board attached at a lens holder;

FIGS. 3 and 4 are sectional views of the camera of FIG. 2, showing bending of the circuit board when the camera is exposed to low and high temperatures;

FIG. 8 is a sectional view of another camera with a circuit board attached at a lens holder via elongated posts;

FIGS. 9 and 10 are sectional views of the camera of FIG. 8, showing the expansion/contraction of the circuit board being accommodated by flexing of the posts;

FIGS. 13-15 are perspective and partial sectional views of another lens holder and posts configuration, showing an adjustable post configuration to achieve athermalization tuning of the camera.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
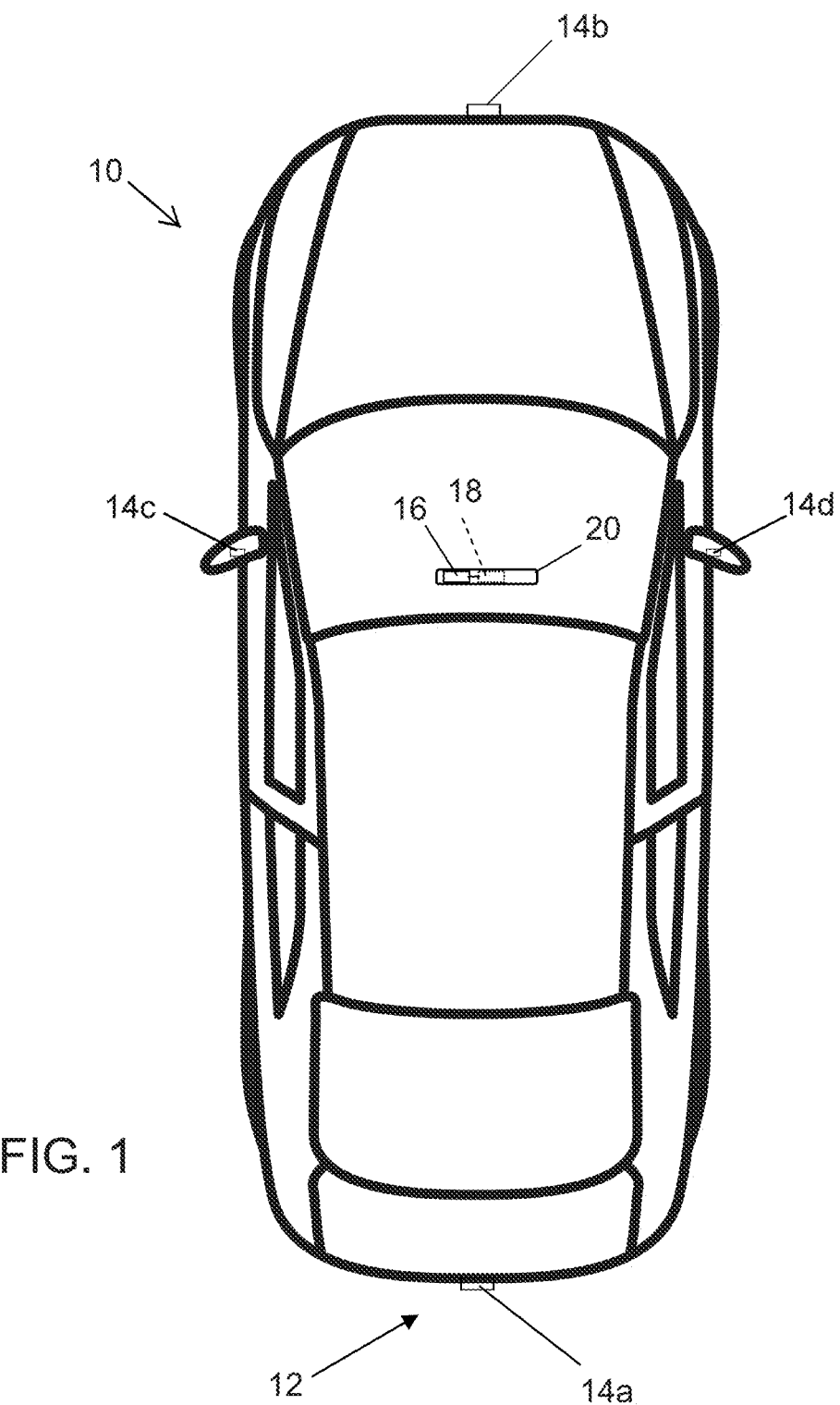
FIG. 1 is a plan view of a vehicle with a vision system that incorporates cameras in accordance with the present invention.

Referring now to the drawings and the illustrative embodiments depicted therein, a vehicle 10 is equipped with an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera and/or system of the present invention may utilize aspects of the cameras and systems described in U.S. Pat. Nos. 9,621,769; 9,596,387; 9,277,104; 9,233,641; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0266430; US-2015-0327398; US-2015-0365569; US-2016-0037028; US-2016-0243987; US-2016-0268716; US-2016-0286103; US-2016-0037028; US-2017-0054881; US-2017-0133811; US-2017-0201661; US-2017-0280034; US-2017-0295306; US-2017-0302829; US-2018-0098033; US-2019-0124238; US-2019-0124243 and/or US-2019-0306966, and/or U.S. patent application Ser. No. 16/451,179, filed Jun. 25, 2019, now U.S. Pat. No. 10,899,275, Ser. No. 16/459,992, filed Jul. 2, 2019, now U.S. Pat. No. 10,676,041, Ser. No. 16/525,666, filed Jul. 30, 2019 and published as U.S. Publication No. US-2020-0033549, and/or Ser. No. 16/662,205, filed Oct. 24, 2019 and published as U.S. Publication No. US-2020-0137926, and/or U.S. provisional applications, Ser. No. 62/913,288, filed Oct. 10, 2019, Ser. No. 62/866,662, filed Jun. 26, 2019, which are hereby incorporated herein by reference in their entireties. It is envisioned that aspects of the present invention may be applied to cameras and/or other types of high precision sensors, such as Lidar or magnetic sensors or the like. Optionally, electrical connections in the camera may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

Automotive cameras, particularly for autonomous vehicle control systems, must maintain precise lens-to-imager relative position throughout the full range of operating temperatures. This is challenging because of the various camera assembly material CTEs (coefficients of thermal expansion). The optical performance of the lens may also be a contributor.

Simulations have been performed on the mechanical and optical design to predict changes as accurately as possible. The actual assembly will often still have a five or more microns lens-to-imager shift due to unforeseen behaviors with the components and optics. Further long-term control is often unachievable.

Automotive cameras typically do not have features in them that allow for active focus correction due to cost and robustness reasons. The camera features that permanently fix the lens position relative to image sensor must therefore be static or predictive throughout the range of anticipated environments. However, all materials experience some amount of temperature-driven expansion or contraction, and the expansion amount may be different for the various materials used in the camera construction. Quite often, an understanding of this effect is predictable and can be compensated for with lens design or athermalization features. These effects are frequently considered as a linear stack of contributors in the direction of the optical axis. A less predictable and less controllable source of change comes from competing stresses in the off optical axis directions. A particular and common problem occurs when the amount of PCB thermal expansion does not match that of the supporting structure. PCB substrates (such as substrates comprising glass fabric-reinforced laminates (FR-4), or ceramic-based PCB materials such as Alumina or Aluminum Nitride or Beryllium Oxide, or polyimide or polytetrafluoroethylene (PTFE) or the like) typically have a coefficient of thermal expansion (CTE) at or below $14\times10^{-6}$ $(°\text{ C.})^{-1}$. Automotive camera enclosure materials, such as Aluminum and Zinc alloys have CTEs that are above $20\times10^{-6}$ $(°\text{ C.})^{-1}$, while most plastics have CTEs that are well above $30\times10^{-6}$ $(°\text{ C.})^{-1}$. This stress condition between the materials may cause the features that hold the PCB at the structure or housing or lens holder to yield and the PCB board will then bend (such as shown in FIGS. 2-4). This bending condition causes either an over focused or under focused condition. Even if the support structures do not yield, the PCB still will bend in the direction that offers the least amount of resistance.

As can be seen with reference to FIGS. 2-4, a camera 14 (such as one of the cameras 14a-d disposed at the vehicle 10 in FIG. 1) has a printed circuit board (PCB) 30 with a component 32 (such as an imager or imaging device or the like) disposed at a surface thereof. The PCB 30 is mounted to the front housing portion or lens holder 34 of the camera, such as via two or more fasteners 36 that extend through apertures in the circuit board substrate and threadedly engage threaded bores at a support structure or attaching portion 34a of the lens holder (such as a structure that circumscribes the lens holder and engages the PCB around the imager). The PCB 30 is thus fixedly attached at the lens holder with the imager 32 optically aligned with the lens 38. As shown in FIG. 2, when the camera is exposed to moderate temperatures, the CTE differences (between the CTE of the PCB substrate and the PCB of the lens holder or support structure) do not impact the focus of the camera. As shown in FIG. 3, the PCB and imager are shown flexing or bending downward at the center region (between the side fixed points that are attached at a camera housing) away from the lens 38 when the camera is exposed to lower temperatures (such as below zero degrees Celsius or such as below −20 degrees C. or thereabouts, such as in a range of zero degrees C. to −40 degrees C.). Such lower temperatures may cause the camera body and structure to shrink more than the PCB substrate material and force the PCB substrate to deflect. In the illustrated example, the sensor is moved away from the lens causing an under focus condition. Similarly, and with reference to FIG. 4, the PCB and the imager are shown flexing or bending upward at the center region (between the side fixed points that are attached at a camera housing) toward the lens 38 when the camera is exposed to higher temperatures (such as above 40 degrees C. or such as above 70 degrees C. or thereabouts, such as in a range of 40 degrees C. to 85 degrees C.). Such higher or extreme temperatures may cause the camera body and structure to expand more than the PCB substrate material and force the PCB to deflect. In the illustrated example, the sensor is moved closer to the lens causing an over focus condition.

One way to limit or reduce PCB stress and bending with temperature changes is to allow the PCB substrate to move freely in directions perpendicular to the lens optical axis. This can be accomplished if some or all of the PCB through-holes for the mounting screws are oversized and the clamp load is controlled. The use of a spring washer can be used with one or more of the mounting screws to consistently control clamp load within a desirable range. This allows the PCB to move while it is kept firmly against the camera's support structure surface to maintain focus.

Figures 5, 6, 7:
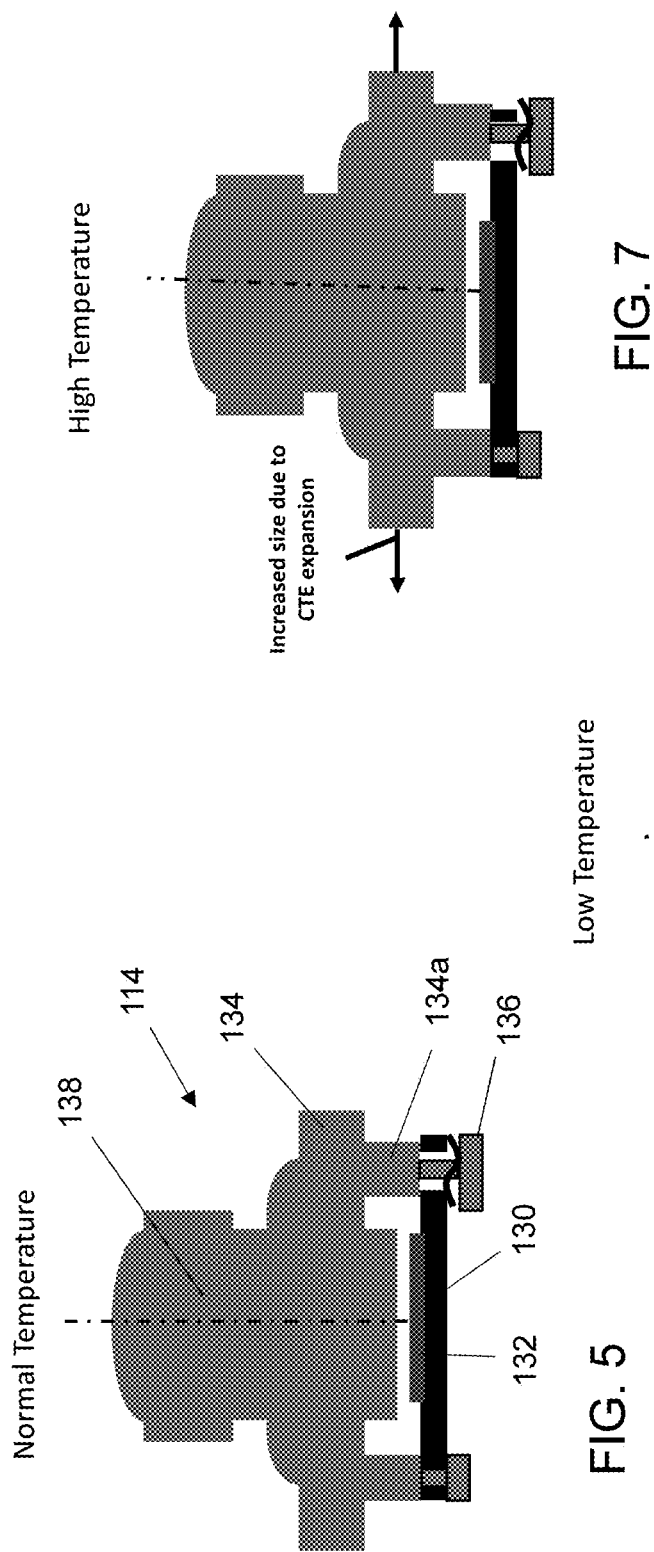
FIG. 5 is a sectional view of another camera with a circuit board attached at a lens holder via at least one oversized fastener hole.
FIGS. 6 and 7 are sectional views of the camera of FIG. 5, showing the expansion/contraction of the circuit board being accommodated by the oversized hole(s) so that the circuit board does not bend or flex.
Figure 12:
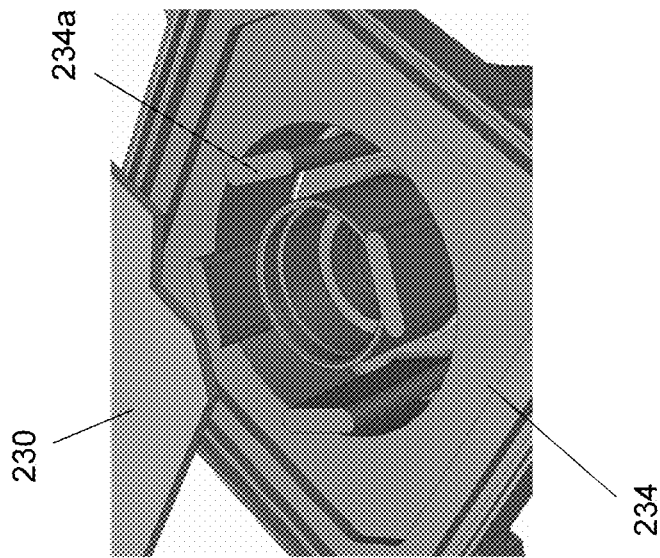
FIGS. 11 and 12 are perspective views showing an exemplary design of the posts, which allow for flexing in one direction and limit flexing in another direction orthogonal to the one direction.
Figure 11:
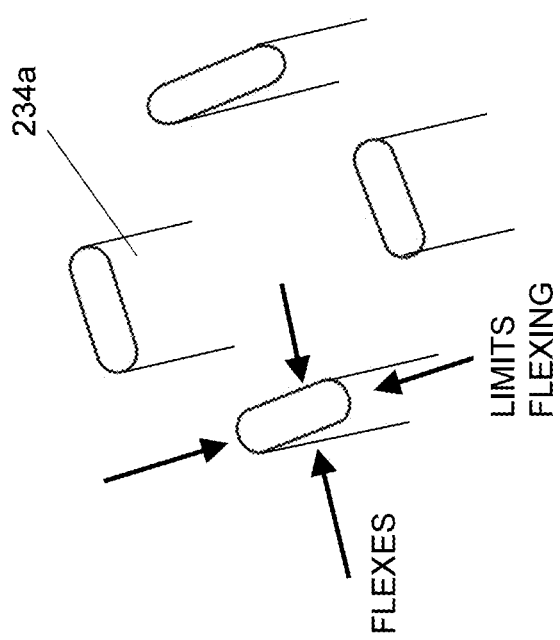

For example, and with reference to FIGS. 5-7, the camera 114 includes oversized PCB holes to allow for difference in thermal expansion between the PCB 130 and the attaching portion 134a of the lens holder or support structure 134. The screw or fastener 136 may have a spring washer at the screw head to control clamp force. With the PCB 130 secured or fastened at the lens holder 134 at normal or nominal or non-extreme temperatures (FIG. 5), the fastener 136 is generally centrally located in the hole through the PCB substrate, and the imager 132 is optically aligned with the optical axis of the lens 138. The circuit board substrate may be fastened to one portion of the support structure via a fastener through an oversized hole and another fastener through a non-oversized hole or via fasteners through respective oversized holes.

As shown in FIG. 6, low temperatures may cause the camera body to shrink more than the PCB material, whereby the PCB is allowed to shift due to the oversized hole (such that the fastener is toward an inboard region of the oversized PCB hole), but the imager may become misaligned with the lens. As shown in FIG. 7, high temperatures may cause the camera body to expand more than the PCB material, whereby the PCB is allowed to shift due to the oversized hole (such that the fastener is toward an outboard region of the oversized PCB hole), but the imager may again become misaligned with the lens. The system may accommodate the shift of the imager relative to the optical axis of the lens by adjusting the processing of the captured image data (to effectively move the center of the active imaging area of the imager to be at the optical axis of the lens), or the camera may include an imager adjustment mechanism to adjust the imager relative to the lens to accommodate such shifting, such as by utilizing aspects of the cameras described in U.S. Publication No. US-2017-0048463, which is hereby incorporated herein by reference in its entirety.

Optionally, another approach to accommodate the different degrees of expansion or contraction is to provide elongated members (of the support structure or lens holder) that support the PCB and that can freely yield without torqueing or stressing the PCB substrate. With this technique, the PCB substrate remains permanently secured to the lens holder or support structure to prevent potential long-term loosening after multiple thermal cycles. The imager also remains in alignment with the optical axis of the lens. The supporting board members can also be shaped to yield readily in a particular direction while resisting in others. A number of such supporting members may be arranged in a way that provides enhanced axial stability as a system, while still allowing for movement only toward or away from the board center.

For example, and with reference to FIGS. 8-12, the lens holder 234 of the camera 214 may include elongated spaced apart posts 234a that extend from the lens holder or support structure (and may be formed as part of the lens holder) and are shaped so that they can yield or flex toward and away from the board center (and the optical axis of the lens) and so that they provide side-to-side support of the PCB 230. This type of arrangement allows for a different board CTE but also provides enhanced overall stability to the structure so that the PCB will not shift its position away from the center axis. The PCB substrate is attached at the distal ends of the posts 234a, such as via an adhesive 236 or the like (or such as via fasteners), with the imager 232 optically aligned with the lens 238. The opposite ends of the posts are at or attached to the lens holder structure.

As shown in FIG. 8, when the camera 214 is exposed to moderate temperatures, the CTE differences (between the PCB and the support structure or lens holder) do not significantly impact the camera's focus. As shown in FIG. 9, when the camera is exposed to low temperatures, which may cause the camera body to shrink more than the PCB material, the posts 234a yield or flex slightly outward (radially outward) to accommodate the lower degree of contraction of the PCB substrate (as compared to that of the lens holder). The posts at opposite sides of the PCB and imager flex the same so that the imager remains aligned with the lens. As shown in FIG. 10, when the camera is exposed to high temperatures, which may cause the camera body to expand more than the PCB material, the posts 234a yield or flex slightly inward (radially inward) to accommodate the lower degree of expansion of the PCB substrate (as compared to that of the lens holder). The posts at opposite sides of the imager flex the same so that the imager remains aligned with the lens.

Optionally, and with reference to FIGS. 13-15, the posts 240a may be part of or extend from a separate part or attaching element 240 that is attached to the lens holder 234, such as via a threaded attachment at the lens barrel or cylindrical lens support structure 234b of the lens holder 234. The posts have their proximal ends attached at or formed with the attaching portion of the element 240, with the circuit board substrate attached at the distal ends of the posts, and with the posts extending generally parallel to a longitudinal axis of the lens barrel.

The post structure comprises a specific CTE lens athermalization component that is selected to provide the desired or appropriate degree of flexing at different temperatures (i.e., is selected to have a particular CTE and size). The lengths of the posts (the overall length of the posts and the length of the posts that extend beyond the threaded attaching portion) are selected or designed to provide the appropriate lens athermalization and to limit PCB bending. For example, the material and dimensions selected for the posts may comprise a low CTE material or a high CTE material and is selected to offset the CTEs and lengths of the other materials to accommodate for expansion and contraction of the other components. Athermalization tuning (adjusting the imager relative to the lens and along the optical axis of the lens) is possible by changing the thread position of the posts on the lens holder/structure.

When plastic parts are molded, the CTE of the molded part is different in the flow direction (the direction of flow of the resin material during the molding process) vs. the cross-flow direction. This imbalance is affected by the percentage of glass fibers, or the length and shape of the fibers, in the plastic molded part. The posts may be molded in a selected or specific orientation or with a selected or specific fiber loading direction to selectively have higher CTE in one direction of flexing of the posts and lower CTE in the other direction of flexing of the posts. Thus, for example, the posts may be formed such that the material composition of the posts allows for radial flexing of the posts while limiting tangential flexing of the posts.

Therefore, the present invention provides for flexible support of the PCB at the lens holder or support structure, such that, as the PCB and lens holder expand/contract differently when exposed to varying temperatures (due to their different CTEs), the PCB does not bend or flex and thus maintains focus of the camera. The vehicular camera, when disposed at a vehicle and during normal use, may experience operating temperatures between about −40 degrees C. to about 85 degrees C. The posts support the PCB at the lens holder and, when the camera is exposed to or operates at higher or lower temperatures, flex or bend in a radial direction (radially inward or outward toward or away from the longitudinal axis of the lens barrel), while limiting flexing or bending in another direction (circumferential or normal to the radial direction) to allow for temperature-driven expansion or contraction of the lens holder relative to the PCB substrate while maintaining alignment and focus of the imager at the lens (by limiting or precluding flexing of the PCB substrate). The camera of the present invention thus maintains focus or enhances focus by the lens at the imager or imaging device, and limits or reduces over or under focusing when the camera is exposed to or operates at extreme temperatures (e.g., below −20 degrees C. and above 50 degrees C.).

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera, the vehicular camera comprising:
a camera housing comprising a first portion and a second portion joined to the first portion;
wherein the first portion of the camera housing accommodates a lens, and wherein the first portion of the camera housing comprises an attaching portion having a first coefficient of thermal expansion (CTE);
a circuit board comprising circuitry disposed at a circuit board substrate having a first side and a second side opposite the first side and separated from the first side by a thickness of the circuit board substrate, the circuit board substrate having a second CTE that is different from the first CTE;
wherein the circuitry comprises an imager disposed at the first side of the circuit board substrate, and wherein the imager comprises an imaging array having at least one million photosensors arranged in rows and columns;
wherein the circuit board substrate is attached at the attaching portion of the first portion of the camera housing;
wherein, when the vehicular camera is operated at an operating temperature greater than 50 degrees C., the attaching portion expands a greater degree than the circuit board substrate; and
wherein, when the vehicular camera is operated at an operating temperature below −20 degrees C., the attaching portion contracts a greater degree than the circuit board substrate.

2. The vehicular camera of claim 1, wherein the lens is accommodated by a lens barrel of the first portion of the camera housing.

3. The vehicular camera of claim 1, wherein the circuit board substrate is attached at the attaching portion of the first portion of the camera housing via at least one fastener.

4. The vehicular camera of claim 3, wherein the at least one fastener threadedly engages the attaching portion to attach the circuit board substrate to the attaching portion.

5. The vehicular camera of claim 1, wherein the circuit board substrate is attached at the attaching portion of the first portion of the camera housing via a plurality of fasteners.

6. The vehicular camera of claim 1, wherein the second CTE of the circuit board substrate is less than the first CTE of the attaching portion of the first portion of the camera housing.

7. The vehicular camera of claim 1, wherein the attaching portion comprises part of an attaching element that is threadedly attached at the first portion of the camera housing.

8. The vehicular camera of claim 7, wherein the attaching element is threadedly adjusted at the first portion of the camera housing to adjust the circuit board substrate and the imager relative to the lens along a longitudinal axis of the lens.

9. The vehicular camera of claim 1, wherein the first portion of the camera housing comprises metal.

10. The vehicular camera of claim 1, wherein the attaching portion comprises a polymeric structure.

11. The vehicular camera of claim 1, wherein the attaching portion is configured to join the first portion of the camera housing with the second portion of the camera housing.

12. The vehicular camera of claim 1, wherein the attaching portion comprises a plurality of posts extending parallel to a longitudinal axis of the lens, and wherein the posts are spaced apart around the longitudinal axis of the lens.

13. The vehicular camera of claim 12, wherein the posts are separate from and inward from exterior walls of the first portion of the camera housing.

14. The vehicular camera of claim 12, wherein flexing of the posts in a radial direction accommodates temperature-induced expansion or contraction of the first portion of the camera housing relative to the circuit board substrate without flexing the circuit board substrate.

15. The vehicular camera of claim 14, wherein each post of the plurality of posts is configured to not flex in a direction normal to the radial direction.

16. The vehicular camera of claim 12, wherein the plurality of posts comprises at least two posts at opposite portions of the circuit board substrate.

17. The vehicular camera of claim 12, wherein the plurality of posts comprises at least four posts spaced circumferentially around the circuit board substrate.

18. The vehicular camera of claim 1, wherein the vehicular camera captures image data for a surround view display of a vehicle equipped with the vehicular camera.

19. A vehicular camera, the vehicular camera comprising:
a camera housing comprising a first portion and a second portion joined to the first portion;
wherein the first portion of the camera housing includes a lens barrel that accommodates a lens, and wherein the first portion of the camera housing comprises an attaching portion having a first coefficient of thermal expansion (CTE);
wherein the first portion of the camera housing comprises metal;
a circuit board comprising circuitry disposed at a circuit board substrate having a first side and a second side opposite the first side and separated from the first side by a thickness of the circuit board substrate, the circuit board substrate having a second CTE that is different from the first CTE;
wherein the circuitry comprises an imager disposed at the first side of the circuit board substrate, and wherein the imager comprises an imaging array having at least one million photosensors arranged in rows and columns;
wherein the circuit board substrate is attached at the attaching portion of the first portion of the camera housing;
wherein, when the vehicular camera is operated at an operating temperature greater than 50 degrees C., the attaching portion expands a greater degree than the circuit board substrate; and
wherein, when the vehicular camera is operated at an operating temperature below −20 degrees C., the attaching portion contracts a greater degree than the circuit board substrate.

20. The vehicular camera of claim 19, wherein the circuit board substrate is attached at the attaching portion of the first portion of the camera housing via at least one fastener.

21. The vehicular camera of claim 19, wherein the second CTE of the circuit board substrate is less than the first CTE of the attaching portion of the first portion of the camera housing.

22. The vehicular camera of claim 19, wherein the attaching portion is configured to join the first portion of the camera housing with the second portion of the camera housing.

23. A vehicular camera, the vehicular camera comprising:
a camera housing comprising a first portion and a second portion joined to the first portion;
wherein the first portion of the camera housing includes a lens barrel that accommodates a lens, and wherein the first portion of the camera housing comprises an attaching portion having a first coefficient of thermal expansion (CTE);
a circuit board comprising circuitry disposed at a circuit board substrate having a first side and a second side opposite the first side and separated from the first side by a thickness of the circuit board substrate, the circuit board substrate having a second CTE;
wherein the second CTE of the circuit board substrate is less than the first CTE of the attaching portion of the first portion of the camera housing;
wherein the circuitry comprises an imager disposed at the first side of the circuit board substrate, and wherein the imager comprises an imaging array having at least one million photosensors arranged in rows and columns;
wherein the circuit board substrate is attached at the attaching portion of the first portion of the camera housing;
wherein the attaching portion is configured to join the first portion of the camera housing with the second portion of the camera housing;
wherein, when the vehicular camera is operated at an operating temperature greater than 50 degrees C., the attaching portion expands a greater degree than the circuit board substrate; and
wherein, when the vehicular camera is operated at an operating temperature below −20 degrees C., the attaching portion contracts a greater degree than the circuit board substrate.

24. The vehicular camera of claim 23, wherein the circuit board substrate is attached at the attaching portion of the first portion of the camera housing via at least one fastener.

25. The vehicular camera of claim 23, wherein the first portion of the camera housing comprises metal.

26. The vehicular camera of claim 23, wherein the attaching portion comprises a polymeric structure.

27. The vehicular camera of claim 23, wherein the vehicular camera captures image data for a surround view display of a vehicle equipped with the vehicular camera.

* * * * *